(12) United States Patent
Kelley et al.

(10) Patent No.: US 10,971,285 B2
(45) Date of Patent: Apr. 6, 2021

(54) THREE-WIRE COMMUNICATION CABLE

(71) Applicant: General Cable Technologies Corporation, Highland Heights, KY (US)

(72) Inventors: Frederick J. Kelley, Lexington, MI (US); Gregg R. Szylakowski, Loveland, OH (US); Scott M. Brown, Independence, KY (US)

(73) Assignee: GENERAL CABLE TECHNOLOGIES CORPORATION, Highland Heights, KY (US)

( * ) Notice: Subject to any disclaimer, the term of this patent is extended or adjusted under 35 U.S.C. 154(b) by 0 days.

(21) Appl. No.: 16/546,072

(22) Filed: Aug. 20, 2019

(65) Prior Publication Data

US 2020/0066426 A1 Feb. 27, 2020

Related U.S. Application Data

(60) Provisional application No. 62/720,182, filed on Aug. 21, 2018.

(51) Int. Cl.
*H01B 11/00* (2006.01)
*H01B 13/02* (2006.01)
(Continued)

(52) U.S. Cl.
CPC ............ *H01B 11/00* (2013.01); *B60R 16/023* (2013.01); *B60R 16/0215* (2013.01);
(Continued)

(58) Field of Classification Search
CPC ... H01B 7/02; H01B 7/04; H01B 7/06; H01B 9/02; H01B 9/04; H01B 9/06;
(Continued)

(56) References Cited

U.S. PATENT DOCUMENTS

| 8,848,810 B2 | 9/2014 | Lee et al. |
| 9,680,666 B2 | 6/2017 | Wiley et al. |

(Continued)

FOREIGN PATENT DOCUMENTS

| CN | 104900326 A | * | 9/2015 | ............... H01B 7/18 |
| CN | 104900326 A | | 9/2015 | |
| GB | 477996 | | 1/1938 | |

OTHER PUBLICATIONS

Sanchez, Adan S. et al.; Three-wire Twisted Cable Modeling and Experimental Validation for MIPI C-PHY in Automotive Applications; DesignCon 2017 Proceedings; 2017; 18 pages.

(Continued)

*Primary Examiner* — William H. Mayo, III
(74) *Attorney, Agent, or Firm* — Ulmer & Berne LLP

(57) ABSTRACT

Three-wire communication cables are useful for operation with a vehicle as vehicular data communication cables. The cables include a cable core formed of three insulated wires twisted together at a defined pitch and a jacket surrounding the cable core. The cables can meet Mobile Industry Processor Interface ("MIPI") C-PHY$^{SM}$ standard (Version 1.2) as well as International Standards Organization ("ISO") 6722-1 (2011) and 14572 (2011).

18 Claims, 2 Drawing Sheets

(51) Int. Cl.
 *B60R 16/02* (2006.01)
 *B60R 16/023* (2006.01)
 *H01B 13/24* (2006.01)
 *H01B 3/44* (2006.01)

(52) U.S. Cl.
 CPC ......... *H01B 13/0207* (2013.01); *H01B 13/24* (2013.01); *H01B 3/445* (2013.01)

(58) Field of Classification Search
 CPC ........ H01B 11/02; H01B 11/04; H01B 13/02; H01B 13/0207; H01B 13/24
 USPC .......................... 174/102 R, 107, 108, 110 R
 See application file for complete search history.

(56) References Cited

U.S. PATENT DOCUMENTS

| | | | |
|---|---|---|---|
| 2010/0236810 A1 | 9/2010 | Mukai et al. | |
| 2012/0099824 A1* | 4/2012 | Cofre Luna | G02B 6/0003 385/101 |
| 2012/0111603 A1* | 5/2012 | Cofre | H01B 7/1825 174/115 |
| 2013/0306214 A1 | 11/2013 | Kenny et al. | |
| 2013/0312992 A1* | 11/2013 | Guetig | H05K 3/3421 174/34 |
| 2014/0251652 A1 | 9/2014 | Poulsen et al. | |
| 2015/0136435 A1* | 5/2015 | Hassel | H01B 1/026 174/47 |
| 2016/0105930 A1* | 4/2016 | Kiss | H05B 3/12 219/544 |
| 2016/0141070 A1* | 5/2016 | Heipel | H01B 7/04 174/72 A |
| 2016/0225487 A1* | 8/2016 | Koeppendoerfer | H01B 7/0216 |
| 2016/0233007 A1* | 8/2016 | Truong | H01B 13/141 |
| 2018/0033523 A1 | 2/2018 | Kusuma et al. | |

OTHER PUBLICATIONS

ABS / ESP Sensor cables, Jan. 24, 2006; Roth, Germany; pp. 1-6, XP055014494; Retrieved from the Internet <URL:http://www.leoni.com/uploads/tx_downloadleoni/en_abs_esp.pdf> [retrieved on Dec. 12, 2011]; date and URL information provided in International Search Report of related International App. No. PCT/US2019/047308.

Alberti, Michele; International Search Report and Written Opinion of the International Searching Authority, issued in International App. No. PCT/US2019/047308; dated Oct. 7, 2019; 12 pages.

* cited by examiner

THREE-WIRE COMMUNICATION CABLE

CROSS-REFERENCE TO RELATED APPLICATIONS

The present application claims the priority of U.S. Provisional Patent Application Ser. No. 62/720,182, entitled THREE-WIRE COMMUNICATION CABLE, filed Aug. 21, 2018, and hereby incorporates the same application herein by reference in its entirety.

TECHNICAL FIELD

The present disclosure generally relates to communication cables including three twisted wires.

BACKGROUND

Vehicles, such as automobiles, increasingly require high bandwidth communication cables to transmit data throughout the vehicle. For example, vehicles increasingly include a number of sensors, such as cameras and radar sensors, for such purposes as augmented awareness, automatic safety features, and self-driving capabilities. Vehicles also increasingly include other high bandwidth devices such as high-resolution displays to display vehicle information or entertainment.

Adan S. Sanchez et al., Three-wire Twisted Cable Modeling and Experimental Validation for MIPI C-PHY in Automotive Applications, DesignCon 2017 Proceedings (2017), describes the modeling and simulation of a C-PHY interface transmitting over a 3-wire twisted cable harness that considerably extends the typical channel length of C-PHY, as demanded by automotive applications. The 3-wire cable is fully characterized both in measurements and simulations. Results including 3D EM modeling of cost-optimized C-PHY cables and eye diagrams for channels of varying lengths are presented.

SUMMARY

According to one embodiment, a three-wire communication cable includes three insulated wires twisted together at a pitch rate, and a jacket layer surrounding the three insulated wires. The insulated wires include a conductive wire and an insulation layer. The jacket layer is formed of one or more of thermoplastic elastic ("TPE") and thermoplastic polyurethane ("TPU").

According to another embodiment, a method of forming a three-wire communication cable includes twisting three insulated wires together at a pitch rate to form a cable core and applying a jacket layer around the cable core. The jacket layer is formed of one or more of thermoplastic elastic ("TPE") and thermoplastic polyurethane ("TPU").

DETAILED DESCRIPTION

The present disclosure is generally related to three-wire communication cables suitable for installation and operation within a vehicle. The three-wire communication cables can be implemented as a vehicular data communication cable in accordance to the Mobile Industry Processor Interface ("MIPI") C-PHY$^{SM}$ standard (Version 1.2) as well as the automotive standards of International Standards Organization ("ISO") 6722-1 (2011) and 14572 (2011). As will be described herein, the three-wire communication cables include a cable core formed of three insulated wires twisted together at a defined pitch and a jacket surrounding the cable core.

Figure 1:
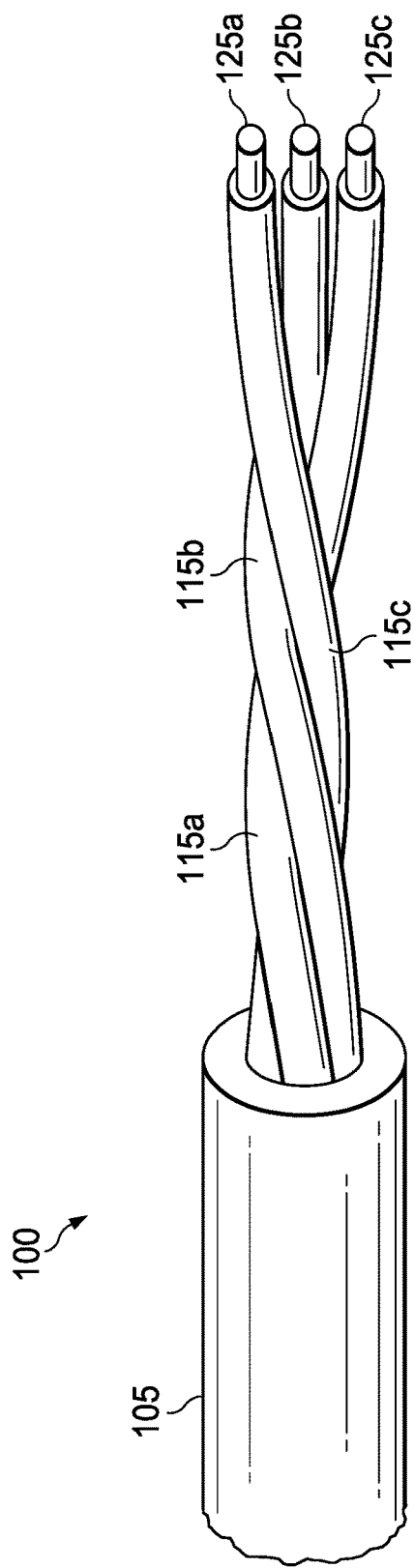
FIG. 1 depicts a perspective view of a three-wire communication cable according to one embodiment.
Figure 2:
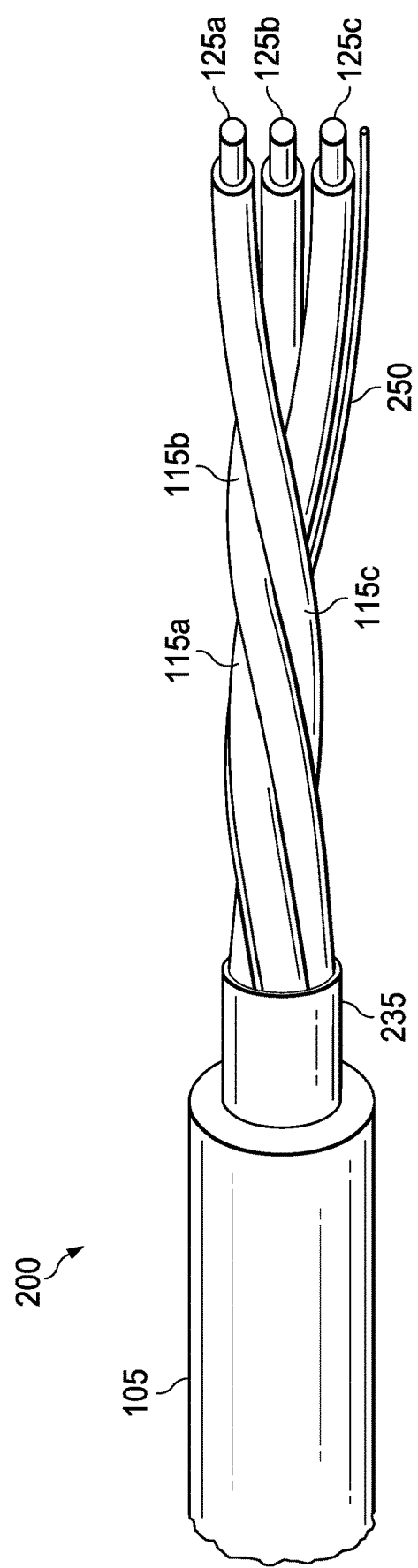
FIG. 2 depicts a perspective view of a three-wire communication cable according to a second embodiment.

Selected embodiments of a three-wire communication cable in accordance with the present disclosure are now described herein in connection with the views and examples of FIGS. 1 and 2, wherein like numbers indicate the same or corresponding elements throughout the views.

FIG. 1 depicts a perspective view of a three-wire communication cable 100 according to one embodiment. The depicted three-wire communication cable 100 includes a jacket 105 and a cable core that is formed of three insulated wires 115a, 115b, and 115c. Each of the three insulated wires 115a, 115b, and 115c are twisted together at a defined pitch and respectively include a conductive core, or conductive wire, 125a, 125b, and 125c. Each of the three insulated wires is of equal length.

As will be appreciated, a variety of materials can be used to form the individual components of a three-wire communication cable (e.g., the jacket 105 and insulated wires 115a, 115b, 115c).

For example, each of the insulated wires can be similar in nature to the insulated wires of a Category 5, 5e, 6A, or 6 communication cable and can include a conductive wire and an insulation layer. The conductive wire can be solid or stranded and can be formed of any suitable conductive metal including one or more of copper, aluminum, steel, and silver. In certain embodiments, the conductive wire can be coated with a corrosion resistant metal, such as tin, to facilitate termination of a three-wire communication cable in areas of a vehicle exposed to harsh environmental conditions (e.g., hot or humid areas, etc.). In certain embodiments, the conductive wire can advantageously be formed of copper due to copper's high electrical conductivity relative to volume.

As can be appreciated, stranded wire can be advantageous in certain embodiments due to the mechanical and electrical advantages exhibited by stranded wire. For example, stranded wires can exhibit increased flexibility and conductivity compared to a solid wire of identical gauge. In certain embodiments, the conductive wire can be a stranded copper wire.

Generally, the insulated wires can be of any suitable wire gauge. For example, in certain embodiments, the insulated wires can be sized in accordance to American Wire Gauge ("AWG") standards and each wire can have a size between 18 AWG and 32 AWG. For example, suitable three-wire communication cables can include three 26 AWG insulated wires or three 24 AWG insulated wires in certain embodiments. As can be appreciated, selection of the wire gauge can vary depending on factors such as the desired cable operating distance, the desired electrical performance, and physical parameters such as the thickness of the cable.

The insulated wires can be insulated with any suitable insulating material which can provide the desired electrical properties. For example, suitable insulation layers can be formed of dielectric materials such as polyolefins (e.g., polypropylene, polyethylene, etc.) or fluoropolymers (e.g., fluorinated ethylene propylene ("FEP"), ethylene chlorotrifluoroethylene ("ECTFE"), perfluoromethyl alkoxy ("MFA" and "PFA"), polyvinylidene fluoride ("PVDF"), etc.). In certain embodiments, selection of a fluoropolymer can be advantageous due to the superior electrical properties (e.g., dielectric properties, and dissipation factors) exhibited by such materials when compared to polyolefins. Of such fluoropolymers, FEP can be particularly advantageous due to a combination of excellent mechanical and electrical properties including advantageous dielectric properties, heat resistance, toughness, flexibility, low coefficient of friction, non-stick characteristics, negligible moisture absorption, low flammability, performance at temperature extremes, and excellent weather resistance. Further properties of FEP are depicted in Table 1.

TABLE 1

| Property | Value |
| --- | --- |
| Specific Gravity | 2.15 g/cm$^3$ |
| Tensile Strength | 3000 psi |
| Elongation at Break | 300% |
| Flexural Modulus | 75,500 psi |
| Hardness, Shore Durometer | 55 (Shore D) |
| Dielectric Constant, 1 MHz | 2.03 |
| Dielectric Constant, 1 GHz | 2.03 |
| Dissipation Factor, 1 MHz | 0.0006 |
| Dissipation Factor, 1 GHz | 0.0004 |
| Dielectric Strength, Short Time, 0.25 mm (0.010 in) Film | 80 (2,000) kV/mm (V/mil) |
| Melting Point | 255° C. |
| Limiting Oxygen Index | >95% |
| Flammability Classification | V-0 |
| Water Absorption, 24 hr | <0.01 |

Additionally, in certain embodiments, any of the described insulation materials can be foamed. As can be appreciated, foaming of the insulation material can further enhance the dielectric properties of the insulation by incorporating air into the material. Generally, the insulation materials can be foamed through known techniques such as the incorporation of a blowing agent.

The thickness of the insulation can vary depending on the desired electrical performance. For example, each insulated wire of a three-wire communication meeting the MIPI C-PHY$^{SM}$ standard (Version 1.2) can have an insulation thickness of about 0.10 mm to about 0.40 mm in certain embodiments, about 0.15 mm to about 0.30 mm in certain embodiments, or about 0.17 mm to about 0.25 mm in certain embodiments. As can be appreciated, the thickness of the insulation can also vary depending on the wire gauge of the conductive wire. For example, 24 AWG insulated wires can include an insulation layer having a thickness of about 0.25 mm while 26 AWG insulated wires can include an insulation layer having a thickness of about 0.17 mm. The insulation resistance can be about 1,000 mΩ/km or greater.

Each of the three insulated wires can be twisted together to form a cable core. As can be appreciated, the degree of twisting, or twist rate, can be determined by measuring the distance between any two consecutive sections of the cable core which exhibit an identical geometry. This distance is called the cable pitch with shorter distances indicating tighter twisting and longer distances indicating looser twisting.

As can be appreciated, the cable pitch can influence various electrical properties of a three-wire communication cable. For example, the cable pitch can influence the electrical impedance of the cable and can influence the cable's susceptibility to electromagnetic interference ("EMI"). The three-wire communication cables described herein can have a cable pitch of about 8 mm to about 30 mm, about 10 mm to about 25 mm, about 11 mm to about 20 mm, or about 13 mm to about 15 mm in various embodiments.

As can be appreciated, automotive vehicles are a challenging environment for the operation of cables as automotive vehicles can exert strong mechanical stresses, dynamic temperature and humidity fluctuations, and exposure to salts, oils, and other fluids to cables routed within the vehicle. Suitable materials for the formation of an outer jacket that can protect the three-wire communication cables described herein have been presently discovered.

In addition to providing mechanical durability to the three-wire communication cable, it has also been discovered that the electrical performance of a three-wire communication cable can be influenced by the outer jacket. In certain embodiments, the outer jacket layer can be formed of a composition have a dielectric constant, measured at 1 MHz, according to ASTM D150-18 of about 5 or less, about 3 or less, or about 2.5 or less such as a thermoplastic elastic composition or thermoplastic elastomer ("TPE") having a dielectric constant of about 2.45.

Formation of the outer jacket with a TPE composition can facilitate the formation of a three-wire communication cable which meets the desired electrical and mechanical properties. As can be appreciated, certain TPE compositions have a low dielectric constant which can result in a significant performance improvement to the electrical performance of the cable. Advantageously, TPE can also exhibit desirable mechanical properties at an elevated temperature of 125° C. and cables with a cable jacket formed of TPE can pass, for example, the Underwriter's Laboratory ("UL") 1581 (2001) test for Maximum Continuous Operating Temperature requirements at 125° C. Such cables can additionally pass the mechanical properties of ISO 6722-1 (2011) and 14572 (2011) commonly required for automotive vehicle cables. In certain embodiments, a suitable TPE composition can be Elexar® EL-8730A from the Teknor Apex Company (Pawtucket, R.I.). Further properties of TPE are depicted in Table 2.

As can be further appreciated however, certain three-wire cables can require less stringent electrical performance and can alternatively be formed of a polymeric composition which can provide sufficient electrical performance and mechanical durability to the cable while having a greater dielectric constant than TPE. For example, the compositions used to form a jacket for Category 5 cable, such as polyvinyl chloride ("PVC"), can be suitable in certain embodiments. Alternatively, the cable jacket can also be formed of a thermoplastic polyurethane ("TPU") composition. As can be appreciated, TPU compositions are formed of block copolymers of polyurethane which include hard and soft segments. TPU compositions can be considered to be a type of TPE composition.

Formation of a three-wire communication cable jacket with TPU can facilitate the formation of a cable which can meet, or exceed, the mechanical properties required in ISO 6722-1 (2011) and 14572 (2011). Jackets formed of TPU can meet such mechanical standards because TPU exhibits resistance to abrasion, has high elasticity and shear strength, and maintains strength over a wide range of temperatures. Additionally, TPU can tolerate exposure to oil, grease, water, and fungus. TPU also has excellent damping characteristics and resistance to tear propagation. Further properties of certain TPU compositions are depicted in Table 2.

TABLE 2

| Property | TPE | TPU |
|---|---|---|
| Dielectric Constant (at 1 MHz) | 2.45 | 5-6.5 |
| Specific Gravity | 1.25 g/c m³ | 1.14 g/cm³ |
| Shore Hardness | 85 (Shore A) | 95 (Shore A) |
| Taber Abrasion | — | 55 mg loss |
| DIN Abrasion | — | 25 mm³ loss |
| E-Modulus | — | 7,500 psi |
| Flexural Modulus | — | 7,600 psi |
| Tensile Strength | 1,800 psi | 5,700 psi |
| Elongation at Break | 600% | 430% |
| Tear Strength | — | 800 lb/in |
| Compression Set | | |
| 22 hours at 70° C. | — | 45% (% of original |
| 22 hours at 23° C. | | 30% deflection) |
| Glass Transition Temperature ($T_g$) | — | −28° C. |
| Vicat Softening Temperature | — | 127° C. |

The cable jacket can be of suitable thickness to provide mechanical durability to the three-wire communication cable. For example, the cable jacket can have a thickness of about 0.10 mm to about 0.50 mm in various embodiments. The cable jacket thickness can also vary depending on the gauge of the insulated wires. For example, in embodiments having 26 AWG insulated wires, the cable jacket can have a thickness of about 0.20 mm while in embodiments having 24 AWG insulated wires, the cable jacket can have a thickness of about 0.28 mm.

In certain embodiments, a three-wire communication cable described herein can include various optional components to further enhance the mechanical or electrical performance of the cable. For example, in certain embodiments, a three-wire communication cable can further include a cable shield to minimize any EMI interference caused by either the cable or surrounding sources of EMI. FIG. 2 depicts an example of a three-wire communication cable 200 which further includes a cable shield 235 and a drain wire 250.

As can be appreciated, the three-wire communication cable 200 depicted in FIG. 2 is generally similar to the three-wire communication cable 100 depicted in FIG. 1 but differs through the further inclusion of the cable shield 235 surrounding the coated wires 115a, 115b, and 115c. The three-wire communication cable 200 further includes the drain wire 250 which is twisted together with the coated wires 115a, 115b, and 115c. The drain wire 250 is electrically connected to the shield and can facilitate grounding of the shield at a termination point.

As can be appreciated, a variety of cable shields can be useful for the three-wire communication cables described herein. For example, suitable cable shields can be formed of metallic foil, braided metal, woven metal, metallized tape, or semi-conductive polymers. As can be appreciated, selection of the cable shield can vary depending on factors such as the required reduction in EMI and required cable flexibility. In certain embodiments, a continuous metallized polyethylene terephthalate tape (e.g., Mylar® from Dupont Teijin Films of Wilmington, Del.) can be suitable when used in combination with a drain wire. In certain embodiments, the tape can include a metallized layer of aluminum. As can be appreciated, the tape can be applied longitudinally, or helically, around the cable core to shield the three-wire communication cable.

Alternatively, a discontinuous cable shield can be included. Discontinuous cable shields can include a plurality of electrically isolated shielding segments that are spaced from each other in a longitudinal and/or radial direction. These shielding segments can advantageously reduce EMI without requiring the inclusion, and grounding, of a drain wire by electrically isolating the cable shield into a plurality of electrically discontinuous regions. As can be appreciated, elimination of the requirement to ground a drain wire can simplify use of a three-wire communication cable and can facilitate use of the cable in portions of a vehicle removed from any suitable grounding point.

As can be appreciated, a variety of discontinuous cable shields can be applied to a three-wire communication cable described herein. For example, a discontinuous cable shield can include a barrier layer and a plurality of longitudinally spaced apart shielding sections disposed on the barrier layer as described in U.S. Pat. No. 9,087,630 which is hereby incorporated by reference herein. Each of the longitudinally spaced apart shielding sections can be formed of a suitable conductive material such as aluminum.

Alternatively, the discontinuous cable shield can be a tape including a plurality of conductive shielding segments disposed on the surface of the tape as described in U.S. Pat. No. 10,186,350, which is hereby incorporated by reference herein. In embodiments wherein a discontinuous cable shield is applied as a tape, the tape can be wrapped around the cable core in any suitable manner including longitudinally and helically. When wrapped around the cable core, it can be advantageous to overlap at least a portion of the discontinuous cable shield with other portions of the discontinuous cable shield to ensure adequate shielding of the cable core. In certain embodiments, about 5% to about 50% of the discontinuous cable shield can overlap; in certain embodiments, about 10% to about 35% of the discontinuous cable shield can overlap; in certain embodiments, about 15% to about 30% of the discontinuous cable shield can overlap; and in certain embodiments, about 25% of the discontinuous cable shield can overlap.

In certain embodiments, the plurality of conductive shielding segments can be encapsulated between two layers of a tape. For example, discontinuous sections of a conductive material, such as aluminum, can be encapsulated between layers of PET tape and can be applied similarly to the previously described discontinuous cable shield tape.

In certain embodiments, a cable shield can alternatively be incorporated directly into the cable jacket. As can be appreciated, such cable jacket shields can be discontinuous as described in U.S. Pat. No. 9,362,027 which is hereby incorporated by reference herein.

If required, a drain wire can be formed of any suitable metal. For example, in certain embodiments, the drain wire can be a 7× tinned copper drain wire. The drain wire can be formed of any suitable gauge of wire. In certain embodiments, a relatively small gauge wire such as, for example, a 26 AWG cable can be preferred to minimize the bulkiness of a three-wire communication cable including a cable shield and drain wire.

In addition to a cable shield, a release agent can optionally be included around a cable core. Inclusion of a release agent, such as talc, can facilitate use of the cable by reducing the force required to remove the cable jacket when stripping and terminating the cable. As can be appreciated, any known release agent such as talc can be suitable. In certain embodiments, a cable separator can be included to separate each of the three insulated wires from each other.

Although the communication cables described herein have been described as including only three insulated wires, it is further contemplated that in certain embodiments additional sets of three insulated wires can be included. For example, communication cables can include three sets of three insulated wires apiece in certain embodiments. As can be appreciated, the design of such cables can be similar to the three-wire communication cables described herein with each set of three wires being twisted similarly to the cable core of the three-wire communication cable. In certain embodiments, a cable separator can be included to separate each of the three sets of three wires. Each of the three sets of three-wires can have a different cable pitch to minimize crosstalk.

The three-wire communication cables described herein can exhibit advantageous electrical and mechanical properties. For example, the cables can electrically meet the requirements of the MIPI C-PHY$^{SM}$ standard (Version 1.2) and can meet the mechanical properties of ISO 6722-1 (2011) and 14572 (2011). As will be appreciated, meeting these standards can enable the cables described herein to be useful for high-bandwidth data communication between various electronic devices in a vehicle.

For example, the MIPI C-PHY$^{SM}$ standard (Version 1.2) contemplates the use of C-PHY$^{SM}$ for data communication with a variety of input/output devices including displays (e.g., monitors, touchscreens, heads-up displays ("HUDS"), instrument displays, augmented reality devices, virtual reality devices, etc.), and sensors (e.g., cameras, radar sensors, lidar sensors, impact sensors, air quality sensors, tachometers, environmental sensors, etc.). The three-wire communication cables described herein can meet the electrical requirements of MIPI C-PHY$^{SM}$ (Version 1.2) and can transmit data at about 2.28 bits/symbol and can achieve a peak data rate of about 8 Gbps with three insulated wires. The three-wire communication cables described herein can meet the MIPI C-PHY$^{SM}$ standard (Version 1.2) over a distance of about 2 meters to about 5 meters, or greater.

As can be appreciated, vehicles can require cables to operate under relatively harsh environmental conditions. For examples, certain portions of a vehicle can be exposed to the outside environment and can have conditions which can vary from sub-freezing temperatures (e.g., below 0° C.) to elevated temperatures above about 50° C. Cables can be routed from such exposed areas to climate controlled areas. Additionally, cables can be routed through mechanical areas of a vehicle, such as an engine compartment, which can have high temperatures, high vibrational loads, and exposure to various chemicals (e.g., oil and fluorinated solvents like antifreeze). In certain embodiments, the three-wire communication cables described herein can be configured to operate under such conditions by meeting the standards of ISO 6722-1 (2011) and 14572 (2011).

ISO 6722-1 (2011) and 14572 (2011) describe international standards for cables used in road vehicles. Collectively, the standards describe the dimensions, test methods, and requirements for cables having a nominal voltage of less than 60 volts DC or 25 volts AC. The standards describe mechanical properties such as minimum operating temperature ranges and minimum bending radii. The three-wire communication cables described herein can meet these requirements particularly in embodiments where the cable jacket layer is TPU or TPE. The three-wire communication cables described herein can operate over a temperature range of about −50° C. to about 150° C., a temperature range of about −40° C. to about 125° C., or a temperature range from about −25° C. to about 100° C. in various embodiments.

As can be appreciated, the three-wire communication cables described herein can be used to transmit data on any vehicle needing high bandwidth data transmission with a durable cable. For example, three-wire communication cables can be useful for data transmission in automobiles, buses, construction and farm machinery, airplanes, marine vehicles, submergible vehicles, lighter-than-air vehicles, unmanned aerial vehicles, rockets, and spacecraft.

As can be appreciated, the three-wire communication cables described herein can also, or alternatively, meet other electrical or mechanical standards. For example, the three-wire communication cables can, in certain embodiments, alternatively meet fire requirement standards and can be used as a plenum-certified communication cable to connect a mobile device to a high-resolution display through a wall space. As can be appreciated, the electrical and mechanical properties of the described three-wire communication cables facilitate the use of the cables in a large variety of environments.

Generally, the three-wire communication cables can be constructed by twisting three suitable insulated wires together at a desired cable pitch to form a cable core and then extruding a cable jacket around the cable core.

Examples

Figure 3:
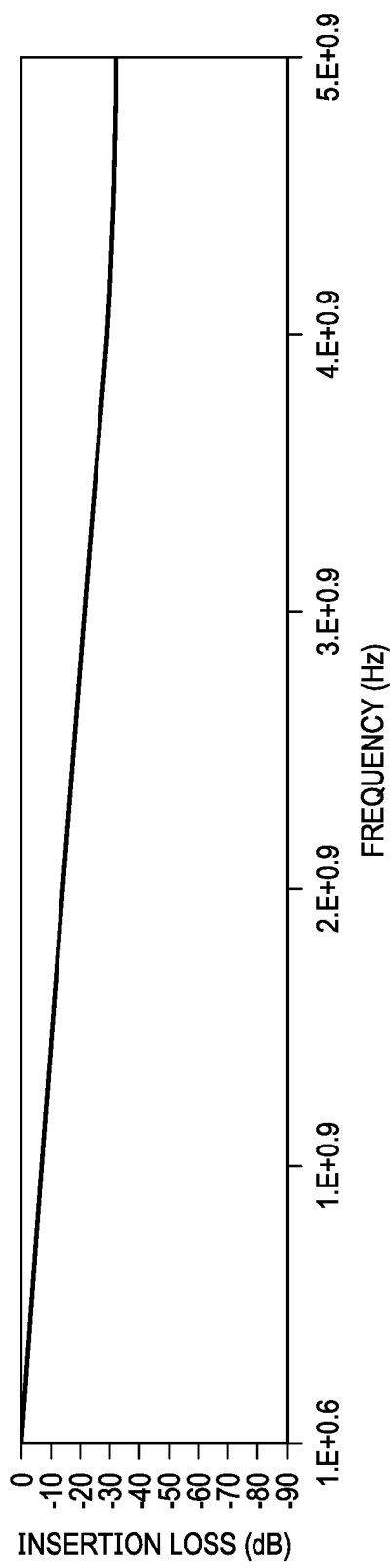
FIG. 3 depicts a graph plotting the relationship between measured insertion loss and frequency for an example three-wire communication cable.
Figure 4:
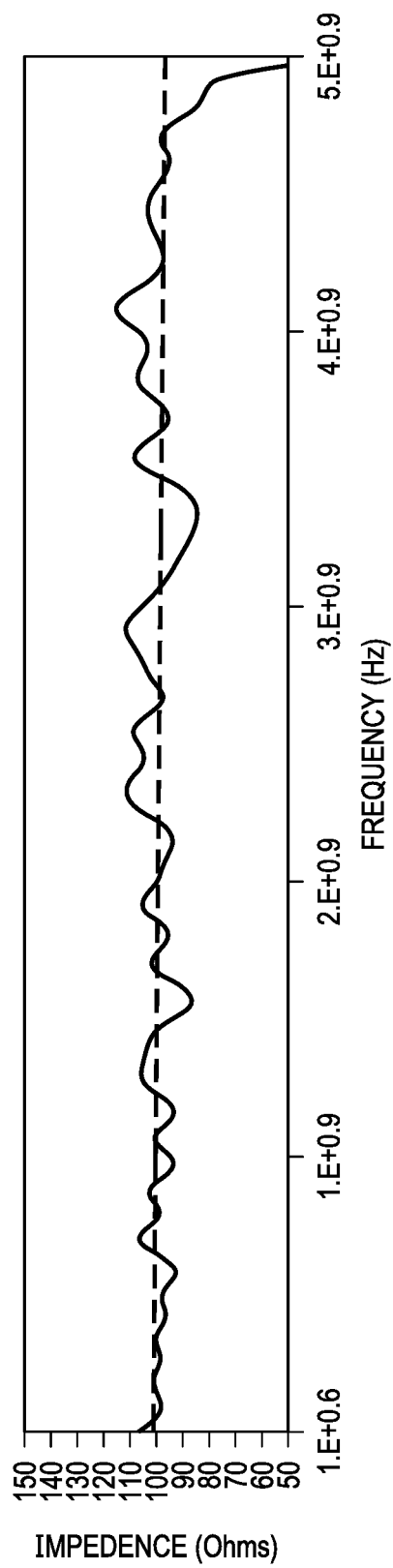
FIG. 4 depicts a graph plotting the relationship between impedance and frequency for the example three-wire communication cable plotted in FIG. 3.

An example three-wire communication cable was constructed with 24 AWG insulated wire. The insulated wire was formed of stranded copper and was insulated with 0.25 mm thick FEP. The example three-wire communication cable was evaluated for electrical performance including insertion loss and impedance at a length of 2 meters and 5 meters using three differential pairs of each length. FIGS. 3 and 4 respectively depict the insertion loss and characteristic impedance as it relates to frequency for the example 2-meter long three-wire communication cable. Electrical performance at 5 meters and with other differential pairs was similar.

As illustrated by FIG. 3, the measured insertion loss was about 9.1 dB at a frequency of about 1.25 GHz and about 30 dB at a frequency of about 5 GHz. It is believed that inclusion of a cable shield will improve the insertion loss. FIG. 4 illustrates that all 12 characteristic impedance values were about 100 Ohm and were satisfactory.

As used herein, all percentages (%) are percent by dry weight of the total composition, also expressed as weight/weight %, % (w/w), w/w, w/w % or simply %, unless otherwise indicated. Also, as used herein, the terms "wet" refers to relative percentages of the coating composition in a dispersion medium (e.g. water); and "dry" refers to the relative percentages of the dry coating composition prior to the addition of the dispersion medium. In other words, the dry percentages are those present without taking the dispersion medium into account. Wet admixture refers to the coating composition with the dispersion medium added. "Wet weight percentage", or the like, is the weight in a wet mixture; and "dry weight percentage", or the like, is the weight percentage in a dry composition without the dispersion medium. Unless otherwise indicated, percentages (%) used herein are dry weight percentages based on the weight of the total composition.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A three-wire communication cable comprising:
    three insulated wires twisted together at a pitch rate, each of the three insulated wires comprising a conductive wire and an insulation layer, and wherein all of the three insulated wires are in contact with each other; and
    a jacket layer surrounding the three insulated wires, the jacket layer comprising one or more of thermoplastic elastic ("TPE") and thermoplastic polyurethane ("TPU");
    wherein the pitch rate comprises a pitch of about 8 mm to about 30 mm.

2. The three-wire communication cable of claim 1, wherein each of the conductive wires comprises copper or aluminum.

3. The three-wire communication cable of claim 1, wherein each of the insulated wires comprises a 24 American Wire Gauge ("AWG") insulated wire or 26 AWG insulated wire.

4. The three-wire communication cable of claim of claim 1, wherein each of the insulation layers comprises a fluoropolymer.

5. The three-wire communication cable of claim 4, wherein the fluoropolymer comprises fluorinated ethylene propylene ("FEP").

6. The three-wire communication cable of claim 1, wherein the jacket layer comprises TPE.

7. The three-wire communication cable of claim 6, wherein the TPE has a dielectric constant of about 2.5 or less when measured at 1 MHz according to ASTM D150-18.

8. The three-wire communication cable of claim 1, wherein the jacket layer comprises TPU.

9. The three-wire communication cable of claim 1, wherein the jacket layer comprises a thickness of about 0.10 mm to about 0.50 mm.

10. The three-wire communication cable of claim 1 further comprises a shield surrounding the three insulated wires.

11. The three-wire communication cable of claim 10, wherein the shield is discontinuous.

12. The three-wire communication cable of claim 11, wherein the jacket layer surrounds the shield.

13. The three-wire communication cable of claim 11, wherein the shield comprises a barrier layer or a tape.

14. The three-wire communication cable of claim 11, wherein the shield is incorporated into the jacket layer.

15. The three-wire communication cable of claim 1 passes one or more of:
    Mobile Industry Processor Interface ("MIPI") C-PHY$^{SM}$ standard (Version 1.2) over a distance of about 5 meters or greater;
    International Standards Organization ("ISO") 6722-1 (2011);
    ISO 14572 (2011); and
    the Maximum Continuous Operating Temperature requirements of Underwriter's Laboratory ("UL") 1581 (2001) at 125° C.

16. The three-wire communication cable of claim 15 passes each of:
    MIPI C-PHY$^{SM}$ standard (Version 1.2) over a distance of about 5 meters or greater;
    ISO 6722-1 (2011);
    ISO 14572 (2011); and
    the Maximum Continuous Operating Temperature requirements of UL 1581 (2001) at 125° C.

17. An automobile comprising the three-wire communication cable of claim 1.

18. A method of forming a three-wire communication cable comprising:
    twisting three insulated wires together at a pitch rate to form a cable core: and
    applying a jacket layer around the cable core;
    wherein all of the three insulated wires are in contact with each other; and
    wherein the jacket layer comprises one or more of thermoplastic elastic ("TPE") and thermoplastic polyurethane ("TPU"); and
    wherein the pitch rate comprises a pitch of about 8 mm to about 30 mm.

* * * * *